United States Patent
Martin et al.

(10) Patent No.: US 6,647,902 B1
(45) Date of Patent: Nov. 18, 2003

(54) PROCESS FOR INCINERATING WASTE PRODUCTS

(75) Inventors: Johannes Martin, München (DE); Peter Spichal, Riederau (DE)

(73) Assignee: Martin GmbH für Umwelt-und Energietechnik, Munich (DE)

( * ) Notice: Subject to any disclaimer, the term of this patent is extended or adjusted under 35 U.S.C. 154(b) by 0 days.

(21) Appl. No.: 09/974,398

(22) Filed: Oct. 10, 2001

(30) Foreign Application Priority Data

Oct. 12, 2000 (DE) .......................... 100 50 575

(51) Int. Cl.$^7$ .............................. F23G 5/00; F23B 7/00
(52) U.S. Cl. ........................................ 110/346; 110/342
(58) Field of Search ............................. 110/191, 192, 110/185, 186, 187, 188, 189, 190, 346, 347, 348, 341, 342

(56) References Cited

U.S. PATENT DOCUMENTS

| 3,334,599 | A | * | 8/1967 | Tanner | 110/8 |
| 3,812,794 | A | * | 5/1974 | Taylor | 110/8 R |
| 4,385,567 | A | * | 5/1983 | Voss | 110/186 |
| 5,009,173 | A | * | 4/1991 | Temelli | 110/244 |
| 5,044,288 | A | * | 9/1991 | Barlow | 110/346 |
| 5,241,916 | A | * | 9/1993 | Martin | 110/348 |
| 5,762,008 | A | * | 6/1998 | Martin et al. | 110/345 |
| 5,950,548 | A | * | 9/1999 | Martin et al. | 110/346 |
| 5,967,064 | A | * | 10/1999 | Keldenich et al. | 110/276 |
| 6,067,916 | A | * | 5/2000 | Martin et al. | 110/348 |

FOREIGN PATENT DOCUMENTS

| DE | 4301082 | 8/1994 |
| EP | 0573756 | 12/1993 |

* cited by examiner

*Primary Examiner*—Ira S. Lazarus
*Assistant Examiner*—K. B. Rinehart
(74) *Attorney, Agent, or Firm*—Cohen, Pontani, Lieberman & Pavane

(57) ABSTRACT

To improve slag quality, on a fired grate, at the end of the main combustion process, where burnable fractions are still present in addition to slag components which are already forming, the burnup rate or burnup intensity is changed by varying the primary air rate in sequential time sections, the time sections preferably being in a ratio of 1:1 and the reduced primary air rate being 50 to 70% of the standard primary air rate.

15 Claims, 3 Drawing Sheets

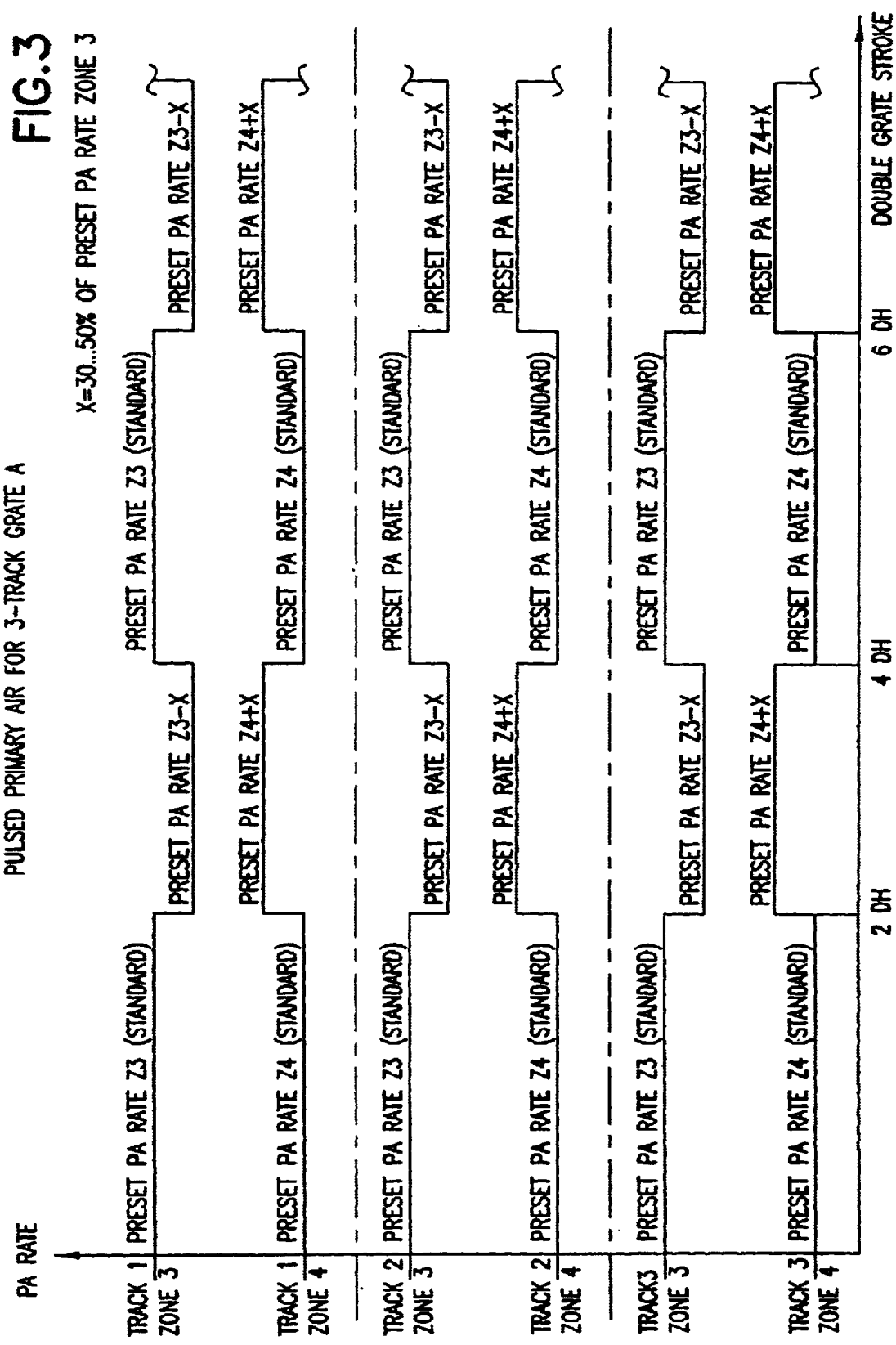

PROCESS FOR INCINERATING WASTE PRODUCTS

BACKGROUND OF THE INVENTION

Figure 1:
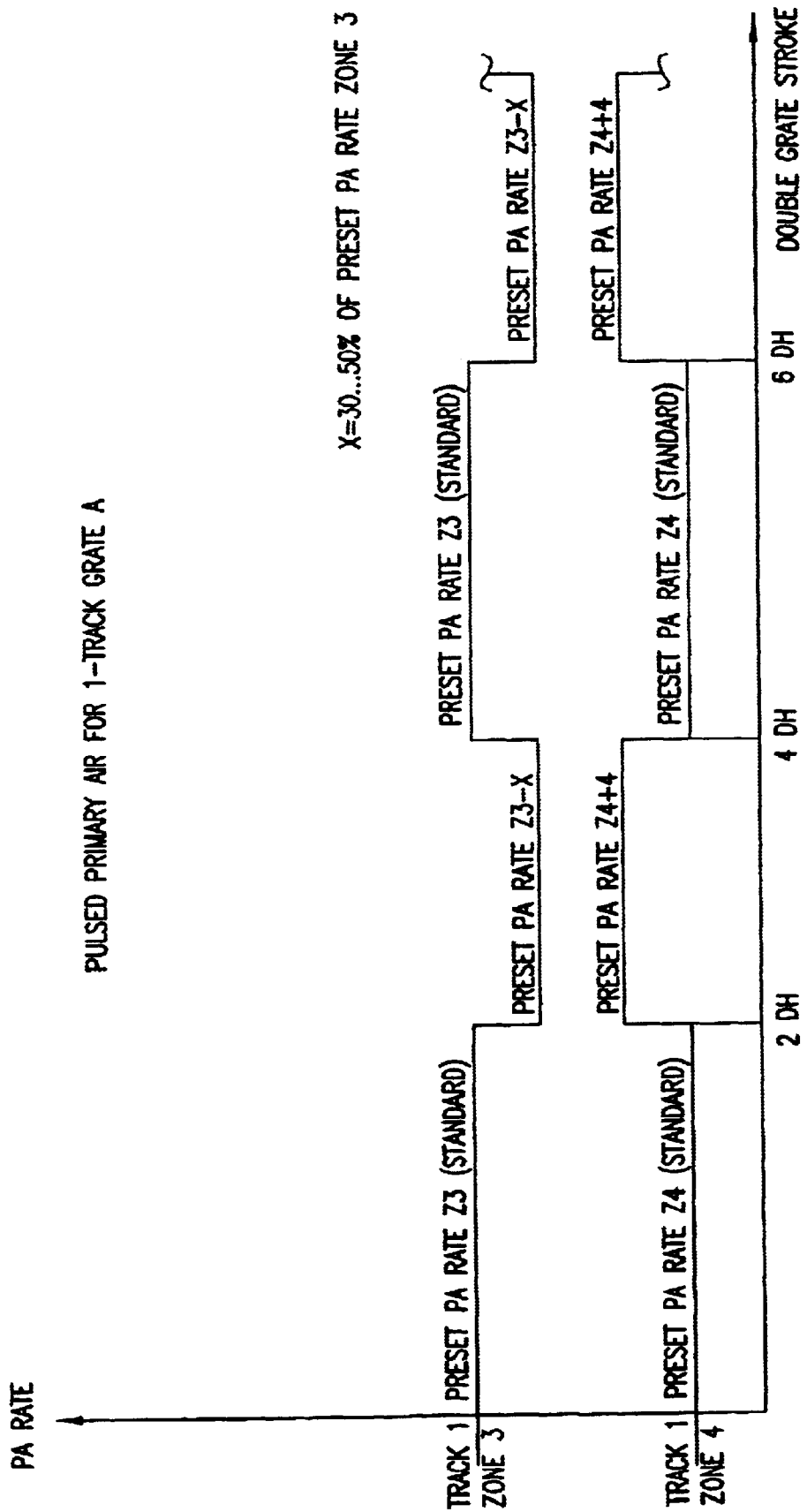

The invention relates to a process for incinerating waste products on a fired grate, in which process the waste products are first dried and ignited, whereupon the main combustion process is carried out and thereafter the resultant slag is discharged.

In past years the fuel refuse or waste has constantly changed in composition to the extent that the proportion of volatile constituents has increased, which is essentially introduced via plastics. In parallel to this, the supply of carbon for combustion directly on the fired grate has decreased. As a result of this development the temperature of the fuel bed and the slag bed on the fired grate has also decreased.

Both phenomena make it more difficult to achieve very good waste slag burnup quality.

By means of certain measures during firing on the fired grate, attempts have already been made to increase again the bed temperature on the fired grate. The most important of these measures are reducing the excess air in the primary combustion on the fired grate, intensifying the fuel bed circulation on the fired grate, for example by increasing the grate stroke rate per unit time, and increasing the primary air temperature. However, there are narrow limits set to a reduction in the excess primary air, since an air feed which is no longer sufficient locally increases the proportion of unburnt solids. Increasing the grate stroke rate, if there is no desire to increase the transport rate of the material stream on the fired grate particularly greatly, is only possible using a reciprocating grate and can lead to an unwanted increase in dust discharge with the combustion exhaust gases. Increasing the primary air temperature, if fuel fractions having particularly high heating values are charged onto the grate, can always lead to unwanted vigorous ignition reactions, resulting in combustion, sometimes uncontrolled. These measures which have been employed previously to achieve improved slag quality have therefore only led to partial success.

It is an object of the invention to provide a process by means of which the combustion processes on the fired grate can be controlled in such a manner that the quality of the resultant slag is improved with respect to its reuse or ability to be landfilled, without the abovementioned disadvantages.

THE INVENTION

This object is achieved according to the invention starting from a process of the type described at the outset by virtue of the fact that, at the end of the main combustion process, where burnable fractions are still present in addition to slag components which are already forming, the burnup rate or burnup intensity is retarded in selectable sequential time sections and is increased in the intermediate time sections.

In the course of the combustion process, the combustion bed, at the end of the main combustion process, passes into a state in which the degree of burnup of the fuel bed is substantially complete and the slag which forms begins to cool. This transition takes place fluidly and frequently changes its position on the fired grate depending on the fuel quality. In this region, zones having wastes which are still to be burnt up and zones having slag which is already beginning to cool exist next to one another in the manner of islands. Since the surface of the fired grate is no longer uniformly covered there with fuel which is still burning, the fuel bed temperature already begins to fall and the slag resulting there can no longer achieve the highest possible quality.

By means of the inventive measure, that is to say the decrease in burnup rate or burnup intensity at times in this advanced state of the main combustion process, the carbon present in the fuel burns slower there and thus during this period in the transition region to slag formation more carbon collects than if a retardation in the burnup rate were not to occur. Thus for the following time section, in which the burnup rate or burnup intensity increases again, sufficient carbon is present in order to increase the combustion bed temperature to the extent that the slag forming in this process has the required quality. The combustion bed temperatures achieved by this procedure are higher than the combustion bed temperatures which can be achieved in the case of uniform combustion sequence operation, because of the deficient carbon supply in the transition region of the fired grate.

By means of the inventive procedure, the combustion bed temperature at the end of the main combustion process is still as high as possible, as stable as possible and has the most even distribution possible over the area on which the main combustion process decreases in intensity. These are the most essential preconditions which must be sought after in order to achieve good slag quality and which are achieved by the inventive process, since, owing to the repeated variation in burnup rate or burnup intensity, increased accumulation of carbon repeatedly occurs owing to the decrease in burnup rate or burnup intensity and a temperature increase following this process is achieved by increasing the burnup rate or burnup intensity in the region in which, hitherto, owing to the altered quality of the fuel, the combustion bed temperature was no longer sufficient to form the desired slag quality. Repeated enrichment of carbon-rich combustion material thus occurs in the region which previously featured too low a combustion bed temperature, in order by burning this repeatedly increased carbon content to increase the combustion bed temperature in the region of slag formation and also to stabilize it and to distribute it evenly.

A preferred measure according to the invention is that the retardation and acceleration of the burnup rate or burnup intensity at the end of the main combustion process are achieved by repeated variation of the primary air rate in the respective time sections in the burnup stage critical for slag quality.

The primary air rate can be varied by decreasing the primary air rate below a standard measure and subsequently increasing the primary air rate to the standard measure. Although, to increase the burnup rate, the primary air rate is preferably increased again to the usual standard measure, the burnup rate or burnup intensity is increased because of the accumulated increased carbon content. Increasing the primary air rate above the standard measure is not required in most cases here. A particularly expedient process sequence is characterized in that the time sections having a quantitatively decreased primary air rate and the time sections having a primary air rate which is standard for this fired grate region alternate constantly in a selectable ratio to one another. Preferably, the two time sections are in the ratio of 1:1.

The sought-after carbon enrichment in the fuel bed at the end of the main combustion process depends not only on the reduction in burnup intensity or burnup rate and thus, for example, on the reduction in primary air rate, but also significantly on the grate movement, that is to say on the fuel advance and the fuel transport rate. It is therefore advantageous if the time section having a decreased burnup intensity or reduced primary air rate is in a preselectable ratio to the number of double grate strokes. To influence the desired carbon enrichment, it is also advantageous if the number of double grate strokes per time section can be controlled.

In practice, it has proved to be advantageous if a time section of decreased burnup intensity or reduced primary air rate is 3 to 6 minutes. It is expedient if the reduced primary air rate is 50 to 70% of the standard primary air rate. An advantageous development of the invention is that the variation in primary air rate at the end of the main combustion process, based on the total combustion process, is quantitatively neutral, that is to say the total amount of primary air is not significantly changed by the inventive procedure compared with a previous standard operation.

The target of improving slag quality is also advantageously influenced by the primary air temperature being increased compared with the ambient air temperature. Preferably, the primary air temperature is controlled in the range from 110° C. to 180° C.

The burnup rate or burnup intensity can also be changed by varying the $O_2$ content of the primary air. It is advantageous here if the $O_2$ content of the primary air is varied with constant mass flow rate of the primary air.

Figure 2:
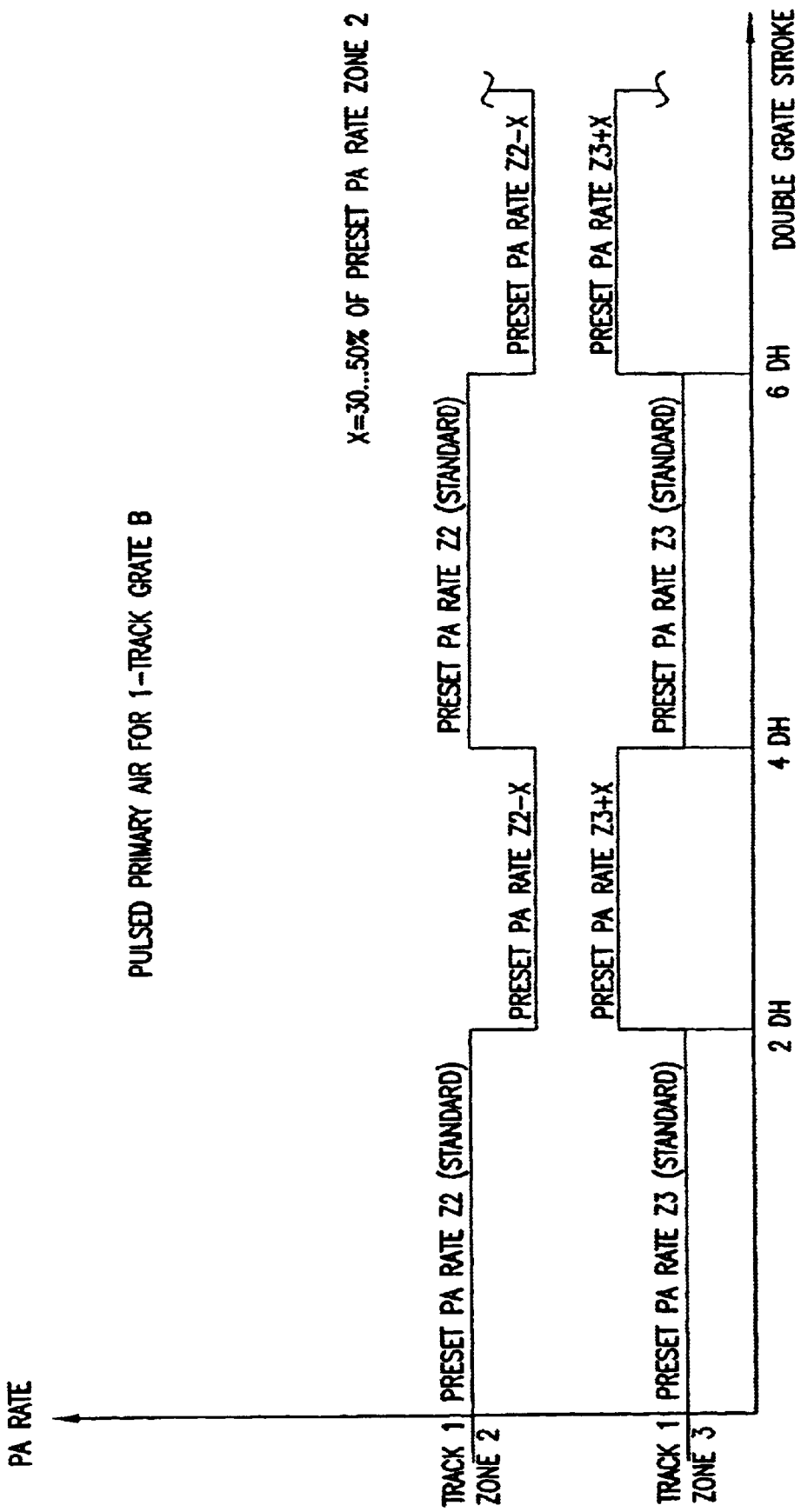

Advantageously, the $O_2$ content can be increased compared with that of the ambient air by feeding pure oxygen to the primary air. Accordingly, the $O_2$ content can be decreased compared with that of the ambient air by feeding nitrogen to the primary air. The $O_2$ content can also be decreased compared with that of the ambient air by feeding recirculated exhaust gas to the primary air. The invention is described by way of example below with reference to various diagrams in combination with the associated experimental results. In the accompanying drawings:

FIG. 1: shows a diagram relating to the relationship between primary air rate and the number of double grate strokes for a 1-track fired grate having five primary air zones;

FIG. 2: shows a diagram corresponding to FIG. 1 for a 1-track fired grate having three primary air zones; and FIG. 3: shows a diagram for a 3-track fired grate having five primary air zones.

The grate designated with the letter A in the drawings is in each case a grate having five primary air zones and the grate designated with B is a grate having three primary air zones.

For all of the experiments, the following parameters were kept constant:
  the heat output 98.8 ±0.7%
  the heating value of the waste materials 2 350 ±6% kcal/kg
  the primary air distribution below the fired grate.
The following parameters were changed:
  the primary air temperature (approximately 125° C. and 160° C.)
  the preset $O_2$ (moist) content (6.4% by volume and 7.0% by volume).
Other details are given in the overview table below.
Observations during operation with pulsating primary air:
  In the region of primary air zone 3 of in total five primary air zones, the slag began to glow dark red in places and small to medium-sized slag clumps formed. The fired grate recirculated these slag clumps very well.
  Granule-type slag now exited at the deslagger discharge, whereas previously, without pulsating primary air, the slag had been earthy and fine-grained.

Slag transport on the shaking chute downstream of the deslagger accelerated and became louder. The shaking chute cleaned itself off completely. Previously, in places, a sandy deposit had adhered.

The two experimental series below illustrate the improvement in slag quality in the inventive process.

| I. Experiments with pulsating primary air: | | | | |
|---|---|---|---|---|
| $O_2$ (moist) % by volume | Primary air temp. °C. | Loss on ignition % by wt. | TOC % by wt. | DOC g/kg |
| 6.4 | 160 | 1.54 | 0.62 | 0.576 |
| 6.4 | 160 | 1.82 | 1.27 | 0.591 |
| 6.4 | 129 | 1.89 | 1.40 | 0.786 |
| 7.0 | 160 | 1.45 | 1.31 | 0.642 |
| Means: | | 1.68 | 1.15 | 0.649 |

| II. Experiments without pulsating primary air: | | | | |
|---|---|---|---|---|
| $O_2$ (moist) % by volume | Primary air temp. °C. | Loss on ignition % by wt. | TOC % by wt. | DOC g/kg |
| 6.4 | 121 | 2.19 | 4.49 | 1.011 |
| 6.3 | 160 | 2.04 | 3.45 | 0.711 |
| 6.5 | 160 | 2.39 | 2.30 | 0.726 |
| 7.0 | 160 | 2.24 | 1.49 | 1.479 |
| Means: | | 2.22 | 2.93 | 0.982 |

Using pulsating primary air achieved the following improvements in slag quality as means of four experiments in each case:

Mean loss on ignition was lowered from 2.22% by weight to 1.68% by weight, which gave an improvement of 24%.

Mean TOC was decreased from 2.93% by weight to 1.15% by weight, which gave an improvement of 61%.

Mean DOC was reduced from 982 mg/kg to 649 mg/kg, which gave an improvement of 34%.

In the experiments, the use of pulsating primary air reduced the amount of flyash per tonne of waste on average over in each case three experiments compared with the experiments without pulsating primary air from 7.5 kg to 6.2 kg per 1 000 kg of starting waste material, which gave a reduction of around 17%.

The abbreviations used are explained below:

| | |
|---|---|
| $O_2$ (moist) | oxygen concentration based on the moist gas mixture |
| PA | primary air |
| PV | preset value |
| TOC | total organic carbon |
| DOC | diluable organic carbon |
| DS | double stroke |

Operation with the primary air changed in alternation, that is to say with pulsating primary air, was only used in the region of grate stages 5 to 8 In the case of grate type A, this corresponded to primary air zone 3.

For grate stages 5 to 8, in the experiments, for 50% of the time the standard primary air rate was used, while for the remaining 50% of the time the primary air rate was reduced by 30 to 50%.

The pulsating primary air is implemented so as to be quantitatively neutral for the total primary air fed to a furnace.

Therefore in the case of grates having an even number of grate tracks, the primary air is redistributed to and fro as follows:

| | |
|---|---|
| 2-track fired grate | zone 3 left ←→ zone 3 right |
| 4-track fired grate | track 1 zone 3 ←→ track 2 zone 3 |
| | track 3 zone 3 ←→ track 4 zone 3 |
| 6-track fired grate | track 1 zone 3 ←→ track 2 zone 3 |
| | track 3 zone 3 ←→ track 4 zone 3 |
| | track 5 zone 3 ←→ track 6 zone 3 | in the case of type A grates having an odd number of grate tracks, the primary air is redistributed to and fro between zones 3 and 4 of the same grate track in type B grates, the primary air is redistributed to and fro between grate zones 2 and 3.

The time cycle of the pulsating primary air is made dependent on the sequence of complete double grate strokes:

During 2 double grate strokes, grate stages 5–8 receive the standard primary air rate.

During the subsequent 2 double grate strokes, grate stages 5–8 receive the reduced primary air rate.

The primary air volume is fed to the relevant primary air zones countercyclically as described above.

An important precondition for good functioning of the pulsating primary air is that the primary air flap valve pairs which are triggered simultaneously but countercyclically achieve their preset values at the same time. This must be heeded particularly when zones 3 and 4 in fired grate A or zones 2 and 3 in fired grate B are to operate simultaneously.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. A process for incinerating waste products on a grate comprising:

drying the waste products;

combusting the waste products in a main combustion process and forming a slag and burnable fractions;

in a burnup stage at the end of the main combustion process where the burnable fractions are still present, introducing primary air at a variable rate in respective time sections of the burnup stage to retard the burnup rate or burnup intensity in selectable sequential time sections and increase the burnup rate or burnup intensity in intermediate time sections wherein(the primary air rate is varied by decreasing the primary air rate below a standard primary air rate and subsequently increasing the primary air rate to the standard primary air rate; and discharging the slag.

2. The process of claim 1, wherein the time sections having a decreased primary air rate and the time sections having a primary air rate, which is standard at the range where the end of the main combustion occurs, alternate constantly in a selectable ratio to one another.

3. The process of claim 2, wherein the two time sections are in a ratio of 1:1.

4. The process of claim 1, wherein in a firing grate, with grate bars which implement a number of stokes, the time section having a decreased burnup intensity or reduced primary air rate is in a preselectable ratio to the number of double grate strokes.

5. The process of claim 4, wherein the number of double grate strokes per time section is controlled.

6. The process of claim 1, wherein a time section of decreased burnup intensity or reduced primary air rate is 3 to 6 minutes.

7. The process of claim 1, wherein the reduced primary air rate is 50 to 70% of the standard primary air rate.

8. The process of claim 1, wherein the variation in primary air rate at the end of the main combustion process, based on the total combustion process, is quantitatively neutral.

9. The process of claim 1, wherein the primary air is at a temperature above ambient air temperature.

10. The process of claim 1, wherein the primary air is at a temperature controlled in the range of from 110° C. to 180° C.

11. The process of claim 1, wherein the primary air has an $O_2$ content and the $O_2$ content is varied to control the burnup rate or burnup intensity.

12. The process of claim 1, wherein the primary air has an $O_2$ content and the $O_2$ content is varied with constant mass flow rate of the primary air.

13. The process of claim 1, wherein pure oxygen is fed to the primary air and the $O_2$ content is increased compared with that of the ambient air.

14. The process of claim 1, wherein nitrogen is fed to the primary air and the $O_2$ content is decreased compared with that of the ambient air.

15. The process of claim 1, wherein exhaust gas is recirculated to the primary air and the $O_2$ content of the primary air is decreased compared with that of the ambient air.

* * * * *